(12) United States Patent
Fortin

(10) Patent No.: US 7,991,941 B2
(45) Date of Patent: Aug. 2, 2011

(54) MEMORY ACCESS ASSIST

(75) Inventor: Eric Fortin, Nepean (CA)

(73) Assignee: Alcatel Lucent, Paris (FR)

(*) Notice: Subject to any disclaimer, the term of this patent is extended or adjusted under 35 U.S.C. 154(b) by 390 days.

(21) Appl. No.: 12/014,303

(22) Filed: Jan. 15, 2008

(65) Prior Publication Data

US 2009/0182925 A1 Jul. 16, 2009

(51) Int. Cl.
*G06F 13/00* (2006.01)
*G06F 13/36* (2006.01)
*G06F 7/02* (2006.01)

(52) U.S. Cl. ............... 710/316; 710/312; 714/819

(58) Field of Classification Search ......... 710/312, 710/129, 316; 714/819
See application file for complete search history.

(56) References Cited

U.S. PATENT DOCUMENTS

| | | | | |
|---|---|---|---|---|
| 5,181,206 A * | 1/1993 | Hashiguchi | | 714/722 |
| 5,539,879 A * | 7/1996 | Pearce et al. | | 714/47 |
| 5,996,046 A * | 11/1999 | Yagisawa et al. | | 711/114 |
| 6,134,623 A * | 10/2000 | Garcia et al. | | 710/311 |
| 6,912,686 B1 * | 6/2005 | Rodriguez et al. | | 714/799 |
| 6,918,001 B2 * | 7/2005 | Fanning | | 710/316 |
| 6,938,188 B1 * | 8/2005 | Kelleher | | 714/43 |
| 6,976,205 B1 * | 12/2005 | Ziai et al. | | 714/807 |
| 7,234,004 B2 * | 6/2007 | Raisch | | 710/5 |
| 7,251,704 B2 * | 7/2007 | Solomon et al. | | 710/316 |
| 7,275,117 B2 * | 9/2007 | Bennett et al. | | 709/250 |
| 7,318,064 B2 * | 1/2008 | Patterson | | 707/101 |
| 7,409,477 B2 * | 8/2008 | Wyatt et al. | | 710/62 |
| 7,454,443 B2 * | 11/2008 | Ram et al. | | 1/1 |
| 7,516,395 B2 * | 4/2009 | Nurmi et al. | | 714/819 |
| 7,650,556 B2 * | 1/2010 | Lee | | 714/758 |
| 2003/0145270 A1 * | 7/2003 | Holt | | 714/766 |
| 2004/0267993 A1 * | 12/2004 | Spencer et al. | | 710/110 |
| 2005/0081124 A1 * | 4/2005 | Luick | | 714/56 |
| 2007/0162621 A1 * | 7/2007 | Condorelli et al. | | 710/1 |
| 2009/0055584 A1 * | 2/2009 | Hafner et al. | | 711/114 |
| 2009/0077661 A1 * | 3/2009 | Allen et al. | | 726/22 |
| 2009/0261857 A1 * | 10/2009 | Marshall, Jr. | | 326/38 |

* cited by examiner

*Primary Examiner* — Mark Rinehart
*Assistant Examiner* — Christopher A Daley
(74) *Attorney, Agent, or Firm* — Marks & Clerk

(57) ABSTRACT

A method and apparatus are provided for facilitating access from a control system to the memory of a processor across two buses, one of which acts as a bottleneck to communication between the control system and the processor. A bridge between the two buses acts as an intermediary. The control system issues simple diagnosis and data loading verification commands across a slow bus to the bridge. The bridge then performs the data intensive tasks by communicating with the processor through a faster bus. The bridge writes and reads data to the processor, and generates checksums of the written and read data. The bridge then returns status information to the control system indicative of the comparison of the checksums. In the case of memory diagnosis, the control system need only issue a simple command to the bridge through the slower, which then diagnoses the memory through the fast bus by writing and reading data, and returns a status to the control system through the slow bus. In the case of verification of loading of data, the bridge generates a checksum of the written data and then generates of a checksum of the data it reads back from the processor through the fast bus, and returns a status to the control system through the slow bus.

16 Claims, 2 Drawing Sheets

MEMORY ACCESS ASSIST

FIELD OF THE INVENTION

The invention relates to optimization of memory access across buses of different speeds.

BACKGROUND OF THE INVENTION

Network processors are often located on an I/O card which is distinct from a control complex card containing a control complex for controlling the network processor. When the network processor is started up, memory attached to the network processor is typically diagnosed and then a boot loader is loaded into the memory. In some systems, particularly legacy systems, the diagnosis and the loading of the boot loader is performed from the control complex.

A high speed bus, such as a PCI bus, provides fast access to the network processor. However the bus communicating between the cards, that is the control complex bus from the control complex card to the I/O card, is often much slower than the PCI bus. The control complex bus is usually a 16-bit asynchronous bus. The PCI bus is typically about 400 times the speed of the control complex bus. A bridge is provided on the I/O card for enabling communication between the control complex using the control complex bus and the network processor using the PCI bus.

In such systems diagnosis of the network processor memory is performed by writing known data to some or all of the memory locations, and then reading back the data from the memory locations and comparing the read values with those that were written. The slow speed of the control complex bus limits how such diagnosis can be carried out at any efficient speed. One solution is to have the control complex issue the write and read commands, but to only write data to a portion of the memory. Another solution is for the control complex to load a boot loader into the network processor, and then have the boot loader perform diagnosis on the memory. However this is complicated, and furthermore is slow due to the large size of the boot loader and the slow speed of the control complex bus. Another solution is build a boot loader ROM into the network processor. However this is expensive since a boot ROM part must be added to the I/O card. Furthermore, the boot loader ROM is typically located on the control complex card anyway, and so a second boot loader ROM may be unnecessary duplication.

Another problem arising from the slow control complex bus speed is the loading of software into the memory of the network processor. Writing of data into the memory requires that the writing of data be verified, in order to spot corruption that may have been missed during the diagnosis process. However verifying of written data requires two passes of data across the control complex bus, once when the data is being written to memory and once when the data is being read from memory. This is particularly a problem for a control complex which loads a boot loader into network processor memory, as the boot loader is typically large.

A solution which allowed diagnosis and verification of data writing to avoid the bottleneck of the control complex bus would increase the speed at which network processors could be started up, especially in legacy systems in which the control complex bus is much slower than the PCI bus which provides access to the network processor.

SUMMARY OF THE INVENTION

In accordance with one aspect of the invention a method of verifying a memory of a processor to a control system is provided, the control system communicating with a bridge through a first bus and the processor communication with the bridge through a second bus. The control system instructs the bridge to verify the memory. Data is written to the memory and a checksum of the data is generated. The bridge reads the data from memory and generates a checksum of the read data. The bridge compares the checksum of the data and the checksum of the read data. Based on the comparison of the two checksums, the bridge sends a status to the control system indicative of whether errors exist in the memory. The control system may instruct the bridge to perform a diagnosis of the memory, in which case the data is written to memory by the bridge writing a pattern of data to the memory. The control system may instruct the bridge to verify loading of data into the memory, in which case the data is written into memory and the status sent by the bridge to the control system indicates that the data was loaded into memory correctly.

In accordance with another aspect of the invention a bridge between a first bus communicating with a control system and a second bus communicating with a processor. The bridge includes a write checksum generator for generating a checksum of data written to memory of the processor. The bridge also includes a read checksum generator for generating a checksum of data read from the memory. The bridge also includes means to provide the control system with a status indicating whether errors exist in the memory as determined by a comparison of the checksums. The bridge may include means for receiving a first control signal from the control system requesting that a diagnosis of the memory be carried out, in which case the bridge also includes a filler for writing a pattern of data to the memory. The bridge may include means for receiving a second control signal from the control system indicating that verification of loading of data sent by the control system is to be carried out, in which case the write checksum is generated for data written from the control system to the memory, the read checksum is generated for data read from memory locations to which the loaded data was written, and the status indicates whether the loading of data was successful.

The methods of the invention may be stored as processing instructions on computer-readable media. The methods may also be stored as processing instructions loaded into an FPGA.

The methods and apparatus of the present invention allow faster diagnosis and data writing into a network processor which is connected to a control complex via a slow control complex bus. By placing high level commands within an FPGA bridge between the control complex bus and the PCI bus, the control complex may initiate execution of large commands on the network processor memory by issuing relatively small commands across the control complex bus to the bridge. The invention may be used with legacy systems which use a slow interface between the control complex card and the I/O card, and may also be used with simple network processors which do not have a built-in boot loader ROM.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
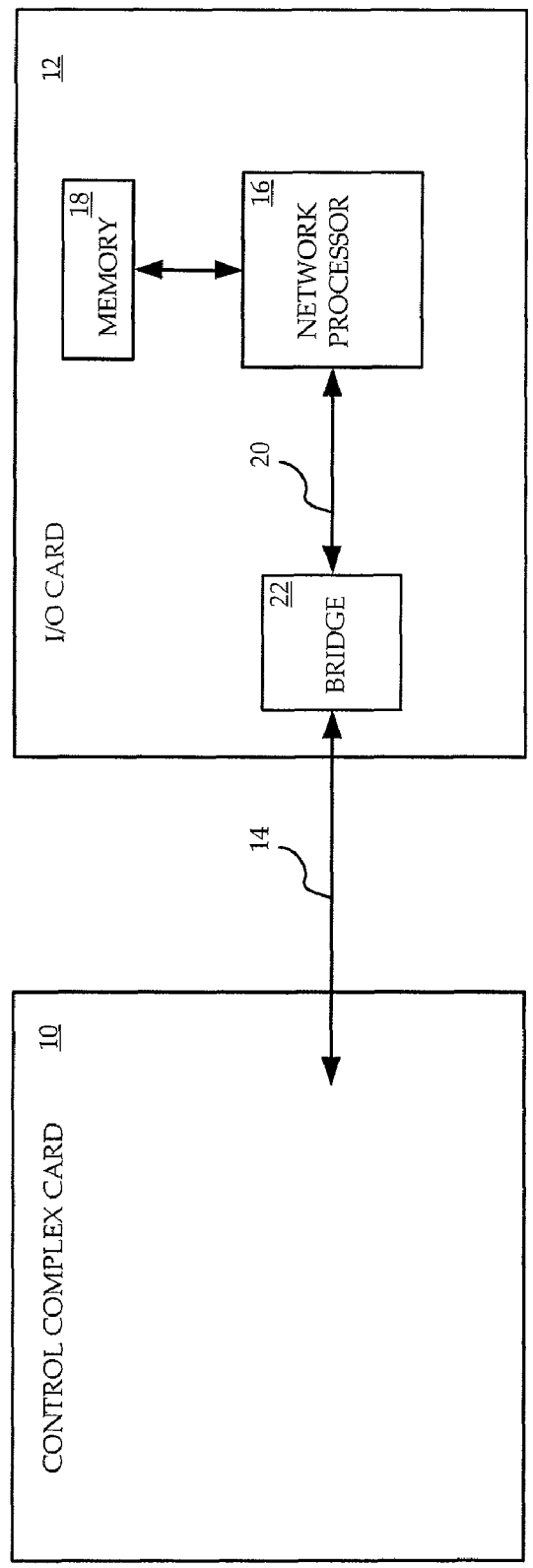
FIG. 1 is a diagram of a control complex card and an I/O card.

Referring to FIG. 1, a control complex card and an I/O card are shown. The control complex card 10 communicates with the I/O card 12 over a control complex bus 14, which is typically a 16-bit asynchronous bus. The control complex card 10 contains control complex software (not shown) which issues commands to and receives responses from a network processor 16 on the I/O card. The network processor 16 has a memory 18 which the commands issued by the control complex may alter and which can provide data for responses to the control complex. Communication to and from the network processor 16 is via a PCI bus 20, which is generally much faster than the control complex bus 14. In order to account for the different speeds of the two buses, a bridge 22 is provided which acts as an intermediary between the two buses.

Figure 2:
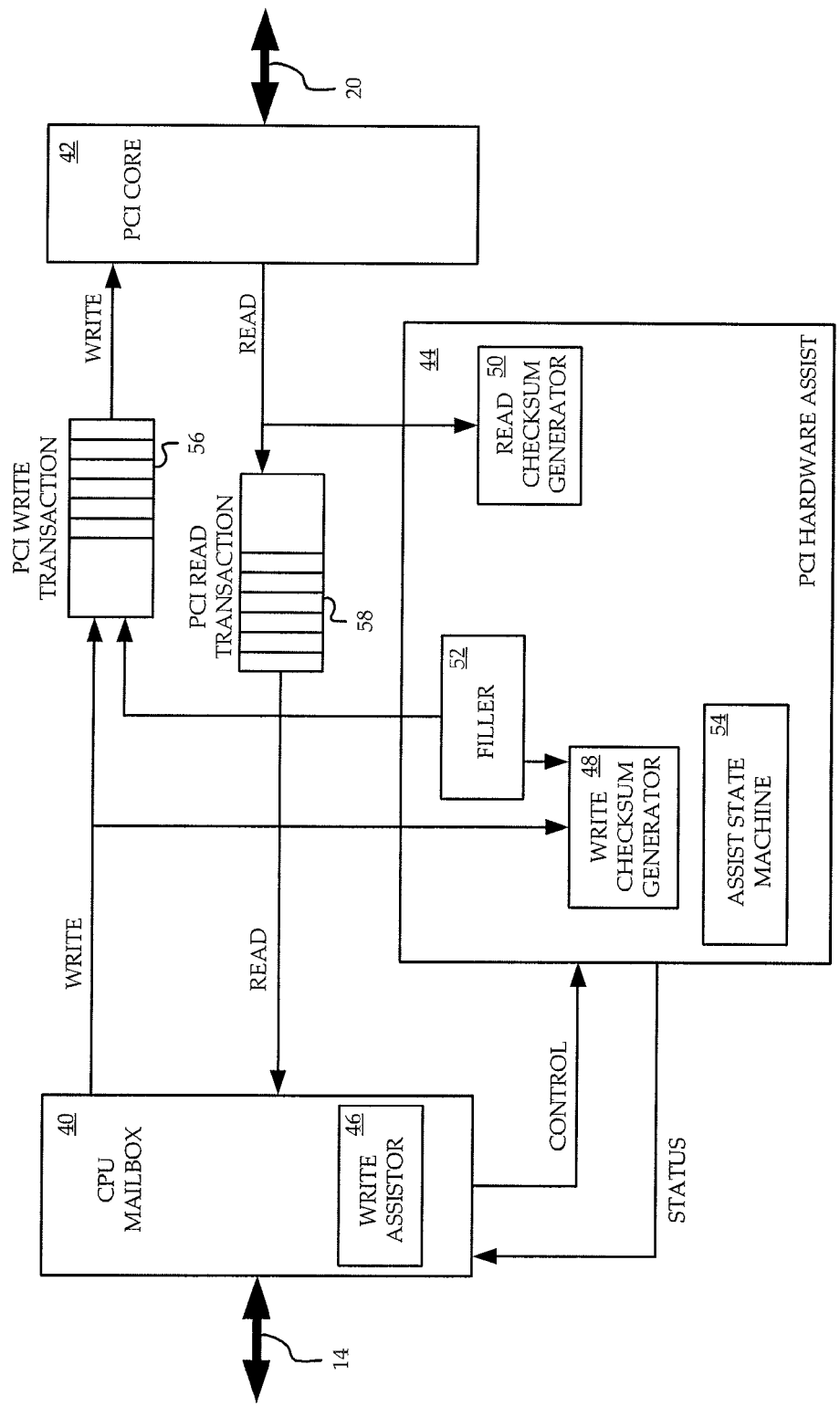
FIG. 2 is a functional diagram of the bridge of FIG. 1 according to one embodiment of the invention.

Referring to FIG. 2, a functional diagram of the bridge 22 is shown according to one embodiment of the invention. Communications from the control complex arrive over the control complex bus 14 at a CPU mailbox 40. Due to the slow speed of the control complex bus 14, the CPU mailbox 40 accumulates numerous accesses in order to form a single PCI transaction. The CPU mailbox 40 may also be used to collect large amounts of data in order to execute a burst transfer through the high speed PCI bus 20. The CPU mailbox 40 also sends communications to the control complex over the control complex bus 14. Communications to and from the network processor 16 pass via the PCI bus 20 through a PCI core 42 which handles low level PCI tasks.

The CPU mailbox 40 includes a write assistor 46. The bridge 22 includes a PCI hardware assist 44 in communication with both the CPU mailbox 40 and the PCI core 42. The PCI hardware assist 44 includes a write checksum generator 48, a read checksum generator 50, a filler 52, and an assist state machine 54.

The bridge 22 is preferably in the form of an FPGA, in which the write assistor 46, the write checksum generator 48, the read checksum generator 50, the filler 52, and the assist state machine 54 are in the form of logical instructions programmed into the FPGA. The logical instructions are deliberately kept as simple high level commands, in to simplify loading of the FPGA. The logical instructions may be stored on a computer-readable medium.

The control complex diagnoses memory of the network processor and loads firmware into the network processor using high level control commands sent to the write assistor 46 and the PCI hardware assist 44. The PCI hardware assist 44 and the write assistor 46 allow the control complex to communicate with the network processor with a lower amount of data passing over the control complex bus 14. Broadly, the control complex performs diagnostics on the network processor by issuing a simple command and receiving a simple status value rather than by transferring entire data sets across the slow control complex bus, because the writing and reading of data is performed only over the faster PCI bus 20. Similarly, verification of loading of data is performed only over the fast PCI bus 20. In each case, the functionality for performing the data intensive tasks is offloaded from the control complex to the bridge.

In the embodiment described above with reference to FIG. 2, the control complex diagnoses memory of the network processor by issuing a diagnose command as a control command to the PCI hardware assist 44. The assist state machine 54 receives this command, and instructs the filler 52 to write a known pattern of data to the network processor. The data written to the network processor may occupy the entire memory of the network processor without significant bottlenecking because the data is written only over the PCI bus 20 and not also over the slower control complex bus 14. The filler 52 initiates a PCI write transaction 56, which the PCI core 42 reads and passes over the PCI bus 20 to the network processor 16. The filler 52 also instructs the write checksum generator 48 to calculate a checksum of the written data, although the write checksum generator 48 may alternatively be so instructed by the assist state machine 54. The assist state machine 54 then instructs the read checksum generator 50 to read the data from the memory of the network processor. The read checksum generator 50 initiates a PCI read transaction 58 and data is read over the PCI bus 20. The read checksum generator 50 calculates a checksum of the read data. The assist state machine 54 compares the checksum of the written data and the checksum of the read data, and returns a status to the control complex over the control complex bus 14 based on the comparison of the checksums, the status indicative of whether errors exist in the memory. It should be noted that the data read from the memory of the network processor is not passed in its entirety to the control complex over the control complex bus 14, as the CPU mailbox 40 simply overwrites read data as it is received from the PCI read transaction.

In the embodiment described above with reference to FIG. 2, the control complex loads firmware to the network processor and verifies the writing by issuing a load data command as a control command to the write assistor 46. The write assistor 46 initiates a PCI write transaction 56 by assigning a registry address and creates a buffer within the CPU mailbox 40. The write assistor 46 also instructs the assist state machine 54 that data is to be loaded into the network processor. The assist state machine 54 instructs the write checksum generator 48 to generate a checksum of the data as it is being written to the PCI write transaction 56. The PCI core 42 passes the data in the PCI write transaction 56 over the PCI bus 20 to the network processor. The assist state machine 54 then instructs the read checksum generator 50 to read back the data that was just written to the network processor (as indicated by the address locations of the written data), and the read checksum generator does so while generating a checksum of the read data. It should be noted that the read data is not passed in its entirety back to the control complex, as the CPU mailbox simply overwrites data as it is read. The assist state machine 54 compares the checksum of the written data and the checksum of the read data, and returns a status to the control complex over the control complex bus 14 based on the comparison of the checksums, the status indicative of whether the data was written correctly.

In both examples above, namely diagnosing memory and verifying the loading of data into memory, advantage of the invention is realized by the use of checksums and reading of the data in memory by elements of the bridge and not by the control complex. In other words, the invention can be viewed as writing data to memory, calculating a checksum of the written data, reading data from memory by the bridge, calculating a checksum of the read data, and reporting the status of the memory to the control complex as indicated by a comparison of the checksums. In the case of memory diagnosis, the writing of data is performed by the filler and the status indicates whether the memory includes any errors. In the case of verification of loaded data, the writing of data is performed by the control complex with the assistance of the write assistor, and the status indicates whether the loading of data was successful.

Variations on the commands and functional structures described above may be used. For example, the high level commands issued by the control complex to the PCI assist may be combined or separated in numerous ways, as long as simple commands and statuses are passed over the control complex bus 14 rather than entire sets of data during diagnosis of the memory of the network processor, and as long as simple statuses are passed over the control complex bus 14 rather than entire sets of data during verification of loading of data into the memory of the network processor.

The invention has been described as using a write assistor to assist in loading data from the control complex into the memory. The increase in write speed from using a write assistor may be significantly less than the increase in read speed from reading the data into only the bridge (as opposed to into the control complex). This is because the data to be loaded must still cross the slow control complex bus from the control complex, and the increase in speed effected by the write assistor is a result of more efficient buffer and address usage within the PCI write transaction. The predominant increase in speed of the embodiment described above arises from not having to pass the read data back across the slow control complex bus. As such, the method and apparatus of the invention are advantageous even without use of a memory assistor. In such an alternative embodiment the control complex sends a control message to the assist state machine indicating that data is being loaded into the memory as usual, and the assist state machine simply instructs the write checksum generator to generate a checksum of the data being loaded from the control complex into the memory.

The invention has been described with a 16-bit asynchronous control complex bus and a PCI bus, a PCI core, and with a network processor. The invention finds advantage in any system which requires a control system to diagnose memory of a processor or verify loading of data into the processor, the diagnosis and verification being conducted through two buses of significantly different speeds, the slower bus being the one in direct communication with the control system, such that a communication bottleneck occurs in the bus closer to the control system. When the bus to the processor is not a PCI bus, then the PCI core is replaced with a core which handles low level tasks appropriate to communication over the bus.

The invention has been described having both a memory diagnostic function and a loaded data verification function. Either of these functions may be implemented alone, with the appropriate functional blocks omitted, and still provide speed improvements.

The embodiments presented are exemplary only and persons skilled in the art would appreciate that variations to the embodiments described above may be made without departing from the spirit of the invention.

I claim:

1. A method of verifying a memory of a processor to a control system, the control system communicating with a bridge through a first bus and the processor communicating with the bridge through a second bus, comprising:
    the control system instructing the bridge to verify the memory;
    writing data to the memory and generating a checksum of the data;
    the bridge reading the data from the memory and generating a checksum of the read data;
    the bridge comparing the checksum of the data and the checksum of the read data; and
    based on the comparison of the two checksums, the bridge sending a status to the control system indicative of whether errors exist in the memory.

2. The method of claim 1 wherein the control system instructing the bridge to verify the memory comprises instructing the bridge to perform a diagnosis of the memory, and wherein writing data to memory comprises the bridge writing a pattern of data to the memory.

3. The method of claim 2 wherein the bridge writing a pattern of data to the memory comprises writing a pattern of data to the entire memory.

4. The method of claim 1 wherein the control system instructing the bridge to verify the memory comprises instructing the bridge to verify loading of data into the memory, and wherein sending a status to the control system comprises sending a status to the control system indicative of whether the data was loaded into the memory correctly.

5. The method of claim 4 wherein writing data to the memory comprises:
    sending the data from the control complex to a CPU mailbox over the first bus; and
    writing the data from the CPU mailbox to the memory in bursts larger than normally allowed by the speed of the first bus.

6. The method of claim 1 wherein the second bus is a PCI bus.

7. The method of claim 6 wherein the first bus is a 16-bit asynchronous bus.

8. A bridge between a first bus communicating with a control system and a second bus communicating with a processor, comprising:
    a write checksum generator for generating a checksum of data written to memory of the processor;
    a read checksum generator for generating a checksum of data read from the memory; and
    means to provide the control system with a status indicating whether errors exist in the memory as determined by a comparison of the checksums.

9. The bridge of claim 8 further comprising:
    means for receiving a first control signal from the control system requesting that a diagnosis of the memory be carried out; and
    a filler for writing a pattern of data to the memory;
wherein upon receipt by the bridge of the first control signal the write checksum generator generates a checksum of the pattern of data, and the status indicates that whether diagnosis was successful based on a comparison of the checksums.

10. The bridge of claim 9 wherein the filler writes a pattern of data to the entire memory.

11. The bridge of claim 8 further comprising means for receiving a control signal from the control system indicating that verification of loading of data sent by the control system is to be carried out, wherein the write checksum generator generates a checksum of data written from the control system to the memory upon receipt of the control signal, wherein the read checksum generator generates a checksum of data read from memory locations to which the loaded data from the control system was written, and wherein the status indicates whether the loading of data was successful based on the comparison of the checksums.

12. The bridge of claim 11 further comprising:
    a CPU mailbox; and
    a write assistor,
wherein the data sent by the control system is sent to the CPU mailbox, and wherein the write assistor writes the data from the CPU mailbox to the memory in bursts larger than normally allowed by the speed of the first bus.

13. The bridge of claim 9 further comprising:

means for receiving a second control signal from the control system indicating that verification of loading of data sent by the control system is to be carried out, and wherein upon receipt by the bridge of the second control signal the write checksum generator generates a checksum of data written from the control system to the memory, the read checksum generator generates a checksum of data read from memory locations to which the loaded data from the control system was written, and the status indicates whether the loading of data was successful based on the comparison of the checksums.

14. The bridge of claim 13 further comprising:
a CPU mailbox; and
a write assistor,
wherein data to be loaded sent by the control system and to be loaded into the memory is sent to the CPU mailbox, and wherein the write assistor writes the data from the CPU mailbox to the memory in bursts larger than normally allowed by the speed of the first bus.

15. The bridge of claim 8 wherein the second bus is a PCI bus.

16. The bridge of claim 15 wherein the first bus is a 16-bit asynchronous bus.

* * * * *